United States Patent [19]

Bailey et al.

[11] 4,401,493

[45] Aug. 30, 1983

[54] REINFORCED STRUCTURES

[75] Inventors: George K. Bailey, Southport; Eric Holroyd, Knutsford; Anthony R. Wright, Nuneaton; David J. B. Perkins, Liverpool, all of England

[73] Assignee: W & A Bates Limited, London, England

[21] Appl. No.: 310,395

[22] Filed: Oct. 9, 1981

[30] Foreign Application Priority Data

Oct. 16, 1980 [GB] United Kingdom ............... 8033330

[51] Int. Cl.³ .................. B29H 17/04; B29H 9/04; D04H 3/05
[52] U.S. Cl. .................. 156/117; 156/397; 156/181; 156/405.1; 156/440; 28/101; 152/359; 152/361 R
[58] Field of Search ............. 156/110 R, 117, 181, 156/397, 405 P, 439–440, 405.1; 28/101–102; 152/354–356, 357–359, 361

[56] References Cited

U.S. PATENT DOCUMENTS

| 662,963 | 12/1900 | Preston et al. | 152/356 |
| 3,681,942 | 8/1972 | Bassist | 156/440 |
| 3,972,767 | 8/1976 | Frazier | 156/397 |
| 4,249,981 | 2/1981 | Pelletier et al. | 156/181 |

FOREIGN PATENT DOCUMENTS

| 848962 | 9/1960 | United Kingdom | 156/117 |
| 1112561 | 5/1968 | United Kingdom . | |
| 1136051 | 12/1968 | United Kingdom . | |
| 1310935 | 3/1973 | United Kingdom . | |
| 1515459 | 6/1978 | United Kingdom . | |
| 1515803 | 6/1978 | United Kingdom . | |
| 1573714 | 8/1980 | United Kingdom . | |

Primary Examiner—Edward C. Kimlin
Assistant Examiner—Lois E. Boland
Attorney, Agent, or Firm—Stevens, Davis, Miller & Mosher

[57] ABSTRACT

An apparatus and method of manufacture for making tire breaker cord fabric comprising a tire cord laying head to lay a zig-zag assembly of a single cord, edge loop holding units and drive means for relatively moving the cord assembly to an elastomeric material coating device.

25 Claims, 7 Drawing Figures

REINFORCED STRUCTURES

This invention relates to reinforced structures and in particular to apparatus for manufacturing tire tread reinforcement fabric, often known as breaker fabric and to the method of operating said apparatus.

It relates more specifically to a special type of breaker fabric as described in assignee's co-pending U.S. patent application No. 283,039 filed July 13, 1981. The breaker fabric there described comprises an elongate sheet of tire cord material embedded in rubber, the elongate sheet having edges spaced apart by the width of the breaker ply for which said fabric in intended wherein at least in the edge regions, the tire cord is all in a single plane such that the sheet in said regions is substantially only one cord diameter thick, the cords extending across the sheet to the sheet edges and each portion of each cord at said edge is folded on itself about an axis perpendicular to the plane of the sheet such that the edges of the sheet are formed by a series of folded cord edges or edge loops. The cords are all formed by a single continuous cord which extends back and forth across the sheet being folded back on itself at each edge in turn.

It is important in tire breaker fabric that the cords are very consistently and accurately positioned and an object of the present invention is to provide an apparatus for assembling tire breaker fabric of the required consistency.

According to one aspect of the present invention an apparatus for making tyre breaker fabric comprises a tire cord laying head arranged to lay a single tire cord to and fro across the fabric formation with edges formed by loops in said cord, a pair of edge holding and retaining units including holding means for each successive edge loop, drive means for relatively moving the laying head and edge holding units in the direction of the centreline of the fabric, a coating device to apply elastomeric material to one side of the retained cord assembly and means for disengaging the edge holding units from the edge loops.

Preferably the tire cord laying head is cycled to and fro in a constant path and the edge loop holding units are moved in the direction of the centreline of the fabric so that the fabric is carried away continuously from the laying head.

The tire cord laying head may comprise a feed guide through which the tire cord is passed and drive and guide means are provided for the feed guide to move it to and fro between the edge holding units. The feed guide may be formed by a pair of co-operating guide rollers which may be grooved and the cord is preferably fed by means of a constant tension device to the feed guide.

The feed guide may be mounted on a carriage running on a rail which extends across a space between the edge units and the carriage may be driven by a drive rod running parallel to the rail. Preferably additional guide and drive means are provided for the feed guide for movement in the direction perpendicular to the direction of movement across the space between the edge holding units so that the cord may be laid around a looped path to form the edge loops. Additional drive means may comprise cams and followers associated with the carriage and the rail.

Preferably the feed guide drive and guide means and the other components comprising the laying head are mounted on a sub-frame so that the angle of the path they traverse may be adjusted so as to lay the cord at different angles to the centreline of the fabric as required for tire breaker fabrics.

The edge holding units may be formed by projecting pins one for each edge loop and these pins are preferably mounted in guide blocks. Two or more adjacent pins may be mounted in a single guide block and the guide blocks are preferably fastened together to form two chains of guide blocks one at either side of the fabric. Guide rails for the guide blocks and synchronized guide means are provided and preferably the drive means is provided to arrange stepwise movement of the pins.

The guide pins are preferably movable axially in the guide blocks so that they may be withdrawn from the edge loops and this movement may be provided by mechanical means such as cams and levers or by means of solenoids.

Loop formers may be provided one within each edge holding unit to close the loops in the cords so that the required small loop radius is consistently achieved despite spring back of the steel cord. The loop formers may comprise a clip formed by a pair of complementary anvils pivotally interconnected at one end and each including a notch to accommodate the pin and a cord. Drive is provided to move the clips to engage each pin in turn to close the anvils on to the pins and cord loop, to open the anvils and to disengage the clip and index it on to the next pin.

The coating device may be a roller or pair of rollers which roll a sheet of elastomeric material, usually unvulcanized rubber compound, into the assembly of tire cord. Two rollers are closely spaced so that the rubber is pressed into the cords. A second layer of rubber may also be applied to the other side of the fabric so that a completely encapsulated fabric sheet may be formed. Alternative coating means may be used such as a platten press or alternatively one roller may run partly immersed in a trough of liquid elastomer which is transferred by the roller to the cord assembly and heaters are provided to rapidly set the elastomer and thus set the assembly.

Another aspect of the present invention provides a method of manufacture for tire breaker fabric comprising a single tire cord having a zig-zag lay in the fabric wherein the method comprises feeding tire cord to a cord feed guide, propelling the feed guide in a first direction across the space between a pair of spaced apart edge holding units each including an edge loop holding pin, relatively moving the feed guide and the holding pins in a direction perpendicular to the feed guide first direction of movement so that the cord is laid around a pin at one side of the space propelling the feed guide back across the space in the reverse direction to the first direction, laying the cord around a pin at the other side of the space, repeating the above steps to produce a sheet of zig-zag assembled cord, applying elastomeric material to a side of the assembly and detaching the pins from the edge loops.

Preferably the feed guide is moved to and fro in a constant path and the holding pins are moved through the apparatus to move the cord assembly from the laying head. This movement is preferably intermittent.

The cord may be consolidated around each holding pin by a crimping device which is brought into engagement with each pin in turn and closed so as to crimp the cord and make the loop radius as small as is required.

Further aspects of the present invention will be apparent from the following description, by way of example only, of one embodiment in conjunction with the attached diagrammatic drawings in which.

A tire breaker fabric machine comprises a main frame to provide support for the various components of the machine and also the main drive and synchronization systems. The machine frame is arranged so that the sheet of fabric being assembled extends downwardly in a vertical plane and the cords are assembled into the required zig-zag shape at the top of the machine from which position they are taken downwardly to a rubberizing unit and the completed sheet of the material emerges from the base of the machine where it can be wound on to a batch up roller which is supported with its axis horizontal immediately in front of the machine.

Figure 1:
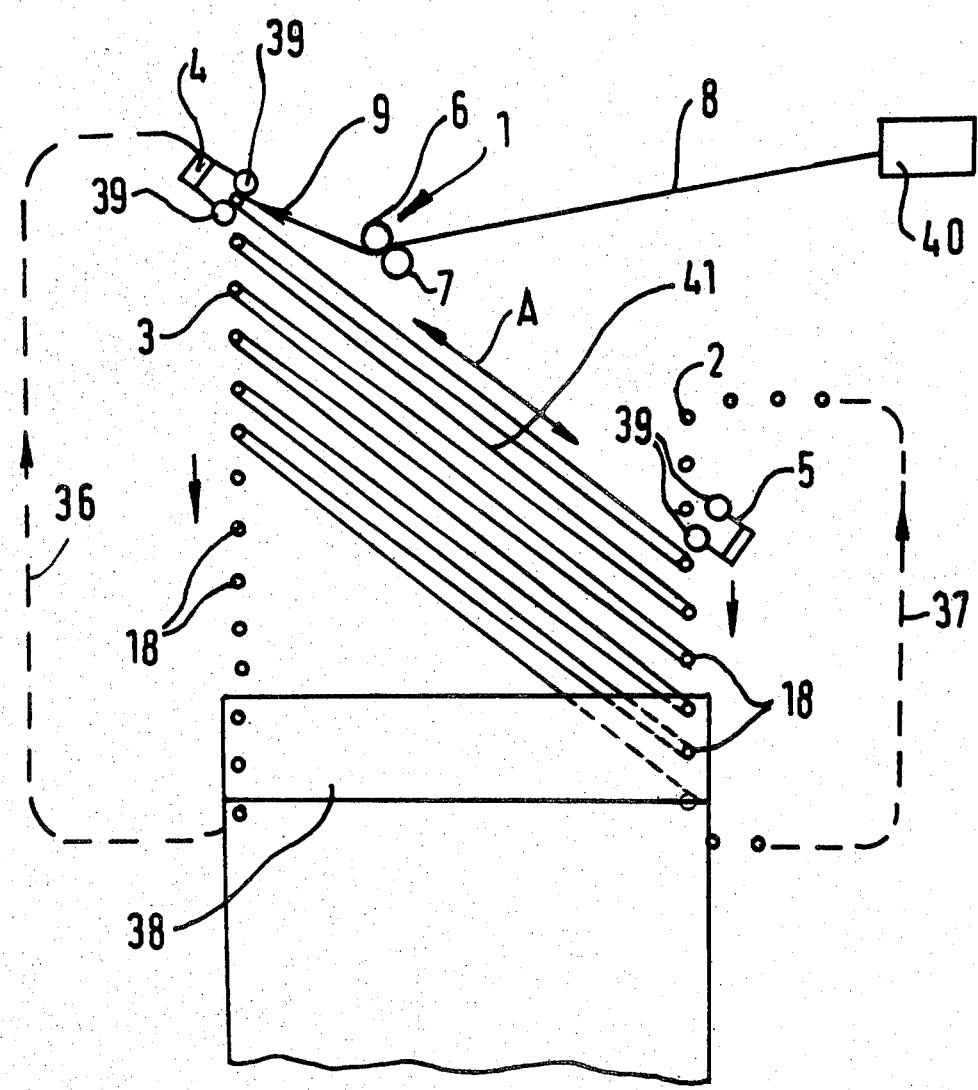
FIG. 1 shows a schematic arrangement of the cord assembling units of an apparatus according to the present invention.

FIG. 1 shows diagrammatically the basic units of this machine; these are the cord laying head 1, two spaced apart edge holding units 2 and 3 and cord edge loop consolidating units 4 and 5.

Figure 2:
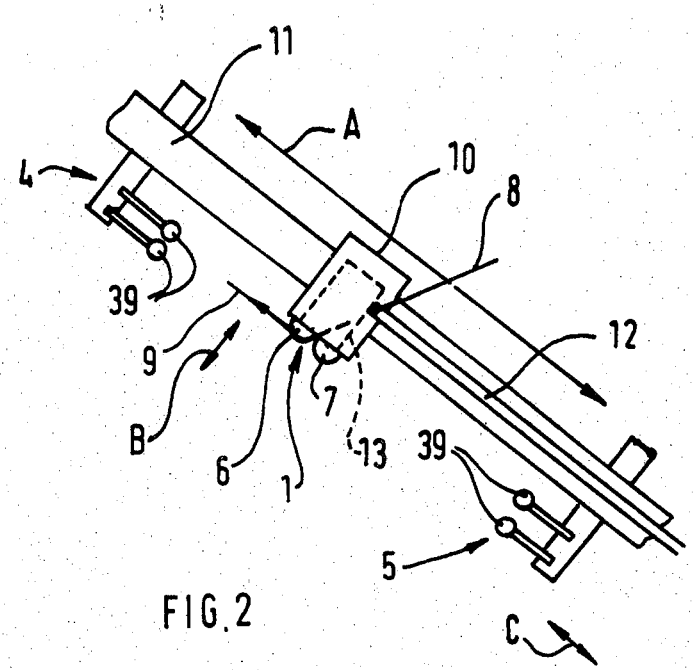
FIG. 2 is an enlarged schematic plan view of the cord laying head to illustrate the various movements.

The cord laying head 1 is shown in more detail in FIGS. 2, 4, 5 and 6 and comprises a pair of co-operating cord guide rollers 6 and 7 which are rotatably mounted about parallel spaced apart axes such that the wire cord 8 can pass between the rollers 6 and 7 which act as a feed guide for the cord emerging in the direction shown by arrow 9 in FIGS. 1 and 2. The feed guide rollers 6 and 7 are mounted on a carriage 10 which itself is slidably mounted by a series of rollers on a rectangular section guide rail 11 and a drive rod 12 is connected to a fork 12a on the carriage 10 at one end, and at the other end, to a crank (not shown) which is rotatable to provide simple harmonic motion to the carriage 10 back and forth along the guide rail 11. Thus the feed guide rollers 6 and 7 can be driven to and fro along the path marked "A" in FIGS. 1 and 2.

The feed guide rollers 6 and 7 are mounted on the carriage 10 via a sub-carriage 13 and the sub-carriage 13 is slidably mounted on the carriage 10 and cam actuation means to be described below is provided to enable the sub-carriage to be propelled back and forth in the direction of arrow B in FIG. 2. The direction of movement B allows the feed guide rollers 6 and 7 to be moved in a direction perpendicular to the main movement "A" first described. The movement in the direction B is a small movement of about 1 cm while the movement in the direction A is a substantial movement typically 1-2 meters dependent on the required fabric width and the angle of lay of the cords to the centreline.

Figure 5:
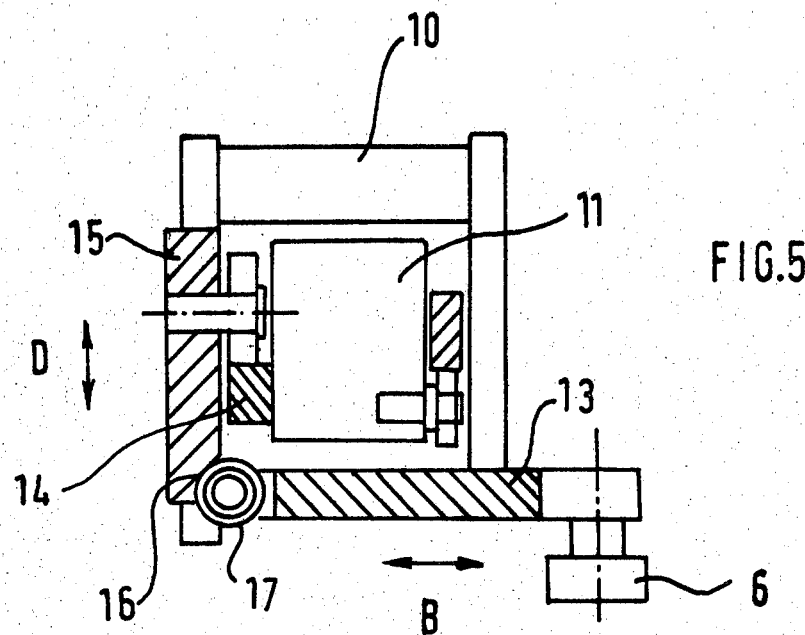
FIG. 5 is a detailed cross-section of the carriage and rail.
Figure 6:
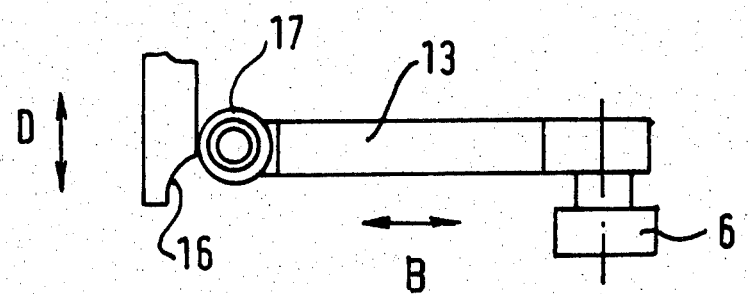
FIG. 6 is a scrap view of the secondary feed guide movement device.

The cam actuation means to propel the sub-carriage 13 in the direction B comprises a fixed cam profile 14 mounted on a face of the guide rail 11 (see FIG. 5). The cam 14 engages a follower roller mounted upon a slider 15 which is moved by the cam and follower roller upwards or downwards in the direction D. One end of the slider 15 is profiled to provide a second cam surface 16 upon which a second follower roller 17 runs. The second follower roller 17 is mounted at one end of the sub-carriage 13 and thus the cam profile 14 may move the sub-carriage 13 and the feed guide rollers 6 and 7 in the direction B as required. Springs are provided as needed to hold the follower rollers against their cam surfaces and provide return movement. A fixed cam profile 14 is provided at each point along the guide rail 11 where movement of the feed guide rollers in the direction B is required and the relevant positions will be apparent from the later description of the operation of the machine.

Figure 7:
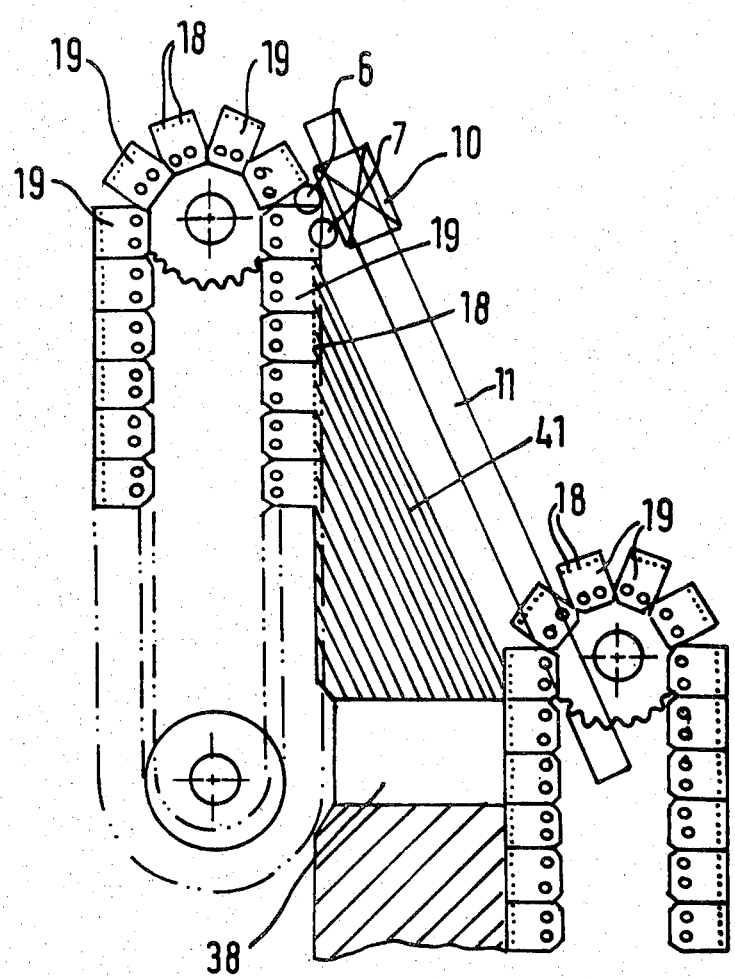
FIG. 7 is a second plan view similar to FIG. 2 but showing the edge holding assemblies and their mountings in greater detail.

The guide rail 11 is mounted on the machine frame so that the feed guide rollers 6 and 7 may be moved to and fro across the machine at an acute angle to the length of the fabric to be made as can be seen from FIG. 1 and FIG. 7. Thus the feed guide rollers 6 and 7 are in the required position to lay the cord to begin assembly of the fabric. The guide rail 11, the carriage 10 and the drive means are mounted on a sub-frame (not shown) which may be pivoted so as to change the angle of the movement to allow different angle fabrics to be manufactured.

Figure 4:
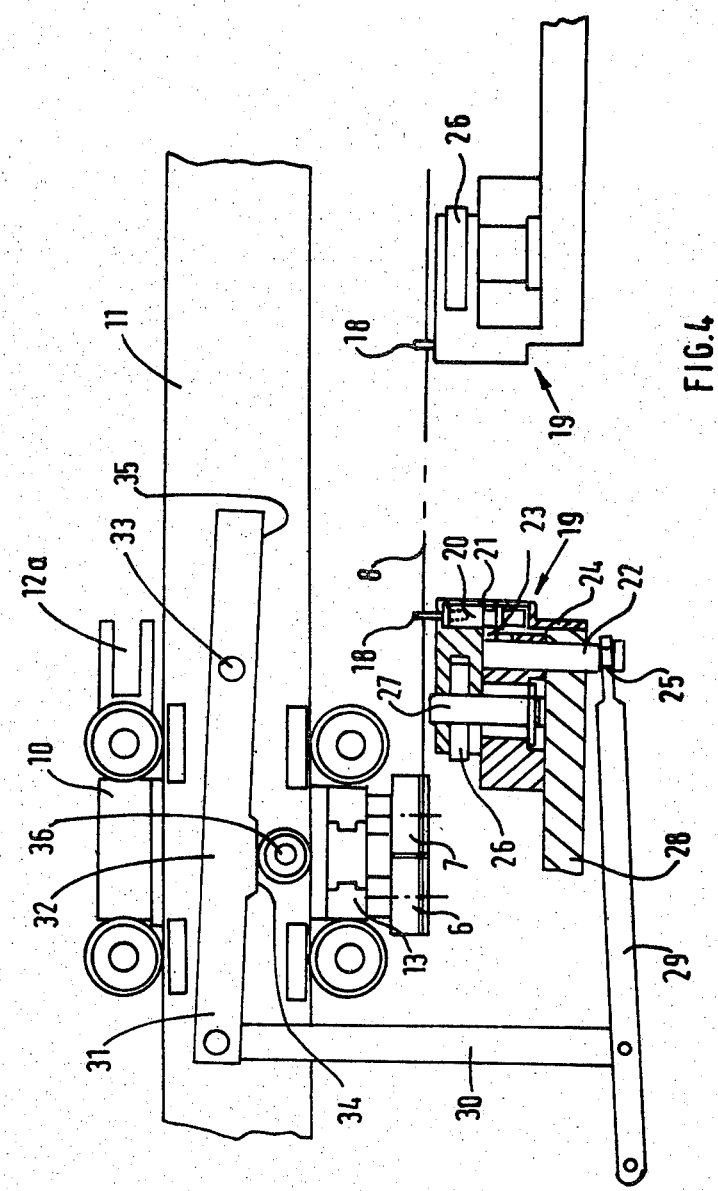
FIG. 4 is a cross-sectional view of the laying carriage and edge holding unit at one side of the traverse with the edge holding unit at the other side of the traverse inserted for completeness.

At either side of the stroke of the laying head is provided an edge holding unit 3 or 4 more details of which can be seen in FIG. 7 and FIG. 4. Each edge holding unit comprises a series of spaced apart projecting pins 18. The pins 18 project perpendicularly to the plane of the fabric being assembled and are each intended to engage within and to hold an end loop of the zig-zag lay of cord.

The pins 18 are mounted in groups of five, although other numbers may be used in each group, for example seven, in pin holding blocks 19. The pin holding blocks 19 each comprise more than one component, see FIG. 4, but basically provide accurate location for the pin 18 together with means to vary the projection of each pin 18 into the plane of the fabric.

Each pin 18 comprises an easily replaceable steel pin which is retained in a cylindrical pin body 20 which is slidably mounted in a guide bore 21. A pin actuator rod 22 is also slidably mounted in the holding block 19 adjacent to each pin body and has at one end a forked link member 23. The forked link member 23 engages a groove machined around the pin body 20 which couples the actuator rod 22 to the pin 18. An L-shaped closure member 24 is attached to the edge of each of the holding block 19 to retain the five pins 18 and their pin bodies 20. Finally, the actuator rods 22 each include a circular groove 25 for engagement by operating means external to the pin body assembly.

Each successive pin body 20 is linked together by a chain link 26 and pins 27 and a bearing track 28 is provided along the edge of the fabric to be made so that two, spaced apart series of rigidly-held equally-spaced pins 18 are obtained, one along either side of the fabric being manufactured.

Thus two chains of pin bodies 20 are used one at either side of the fabric as shown in the Figures and each chain is provided with end sprockets and interlinked and synchronised drive means including means to effect stepwise movement in the direction of the length of the fabric.

Two methods of actuation for moving the pins 18 are provided. At the top of the machine, where the cord is being laid, an operating lever 29 engages the circular groove 25 of the rod 22 in the laying position. The lever 29 is moved by a link 30 attached to an end 31 of a pin operating lever 32. The operating lever 32 is pivotally mounted upon a pivot 33 mounted to the machine frame and positioned so that the operating lever 32 lies alongside the guide rail 11 at one end of its stroke. The operating lever 32 has two cam surfaces 34 and 35 so that contact by a cam follower with either one cam surface causes the operating lever to rock and raise or lower the pin 18 to which the lever 29 is engaged. A cam follower 36 is attached to the carriage 10 and comprises a roller positioned on the carriage so that the contact with one cam surface 34 lifts the pin 18 as the carriage 10 approaches it and as the carriage leaves the pin 18 the second cam surface 35 is contacted to return the pin 18 to its initial position.

At a lower position in the machine, near the end of the straight run of the pins 18 cam guide (not shown) engages the groove 25 in the actuator rod 22 and progressively, as the pins are moved downwards, the pins 18 are pulled back into their holding blocks 19 to disengage from the cord loops. Further details of this pin movement will be given below.

The broken lines 36 and 37 in FIG. 1 indicate the closed paths of the chains of pins 18 for the two edge units 3 and 4.

A rubber coating roller 38 is provided towards the bottom of the machine frame having its axis horizontal and being arranged so that the roller may act to apply a thin veneer of rubber to the cord assembly as will be described in relation to the operation of the machine. The roller 38 is positioned so that the rubber is applied over the holding pins 18.

The two cord loop consolidating units 4 and 5 each comprise a pair of co-operating anvils 39 each mounted at the end of a lever which is pivotally mounted on a consolidating carriage. Means are provided to enable the two anvils to be moved together with necessary limit means and adjustment means to allow the degree of movement to be accurately pre-set. Each of the consolidating carriages are mounted on the same guide rails 11 as the laying head 10 and drive levers are provided so that a short movement shown by arrows C is obtained when required.

The operation of the machine is as follows:

The two edge units 2 and 3 provide the parallel sets of edge holding pins 18 as shown in FIGS. 1 and 7. The sets of pins in the assembly region which is shown extend downwardly of the machine. The cord laying head is arranged to lie towards the top of the machine and extend across the plane of the ends of the pins 18 as shown.

Figure 3:
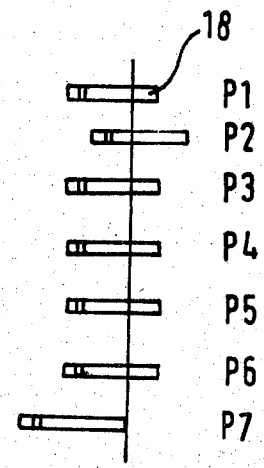
FIG. 3 shows the different positions of the edge loop holding device for the machine.

Tire cord 8 is taken from a constant tension device 40 to the feed guide rollers 6 and 7 which, mounted on their carriage 10, are repeatedly traversed back and forth across the machine as shown by arrow A. In the position of the laying stroke of the feed guide rollers 6 and 7 the edge holding pin 18 is raised as the carriage approaches the pin so as to project from the other pins and the plane of the fabric by the cam surface 34 being engaged by the follower 36 (see pin position P2 in FIG. 3). When the feed guide rollers 6 and 7 pass the pin 18 the cam 35 operates to move the sub-carriage 13 and thus the feed guide rollers 6 and 7 in the perpendicular direction of arrow B and immediately following that the carriage 10 movement is reversed. The result is that the cord is laid around the pin 18 and the carriage begins to lay the next traverse of cord across the space between the two sets of pins 18. During this return stroke a second cam on the rail 11 returns the sub-carriage 13 in the direction B to its original position so that when the carriage reaches the other side of the fabric the same movement may be used to run the cord around the pin 18 and thus the zig-zag lay of cord is made. As soon as the laying head leaves the pin in position P2 the loop consolidating unit 4 is moved in an inward direction C so that the anvils 39 grip the cord onto the pin 18 and consolidate the bend of the cord by nipping it. The consolidating unit 4 is then withdrawn in the direction C and the pin 18 is retracted to the position P3 in FIG. 3 by the second cam 35 being contacted by roller 36. The consolidation operation and the pin withdrawal operation to position P3 are effected before the laying head reaches the other end of its stroke and the two sets of pins 18 comprising each of the edge units 2 and 3 are also indexed downwardly by half a pitch ready for the laying of the next cord end loop. During this operation the constant tension unit 40 maintains the cord tension and the synchronization of the movement of the pins 18 retains previously laid cord at a constant tension. Thus the pins 18 carry downwardly further into the machine a zig-zag cord formation 41. The cord formation 41 is maintained on the pins throughout the other positions P4, P5, to P6, although the number used in FIG. 3 does not shown as many pins as would be used in practice. At the lower position P6 the formation 41 comes into contact with the elastomer coating roller 38 which rolls a thin sheet of rubber into the top surface of the assembly and presses it so that the cord formation is retained. Finally at the lower position of the pins P7 the cam guide engages the grooves 25 and withdraws the pins 18 from the loops in the edges of the fabric. The pins 18 then return in their holding blocks on their endless chains to the top of the machine for subsequent use immediately prior to which the pins 18 are brought forward into the P1 position. The fabric assembly is then consolidated by applying a second sheet of rubber to the other side and passing it through the nip in a pair of rollers following which the fabric is taken to a haul-off unit and batched up.

Other rubberizing means may be used. for example, a stationary platten which is brought into contact with the assembly when it is stationary. Furthermore rubberizing may be carried out in stages by applying several strips, each extending longitudinally, at different times.

Similarly, it will be appreciated that many of the mechanical components described can be replaced by alternative means.

Having now described our invention what we claim is:

1. Apparatus for making a tire breaker fabric comprising an elongate sheet of tire cord fabric embedded in elastomer in which the cords extending across the sheet are formed by one single continuous tire cord which extends back and forth across the sheet so that the edges of the sheet are formed by a series of folded cord edges, the aparatus comprising
   (a) a pair of parallel spaced apart edge holding and retaining units;

(b) each edge holding and retaining unit comprising a plurality of longitudinally spaced retractable holding pins attached to endless belt means;

(c) a tire cord laying head for laying one single continuous tire cord to and fro between said edge holding and retaining units;

(d) stepwise drive means for effecting relative movement between said endless belt means and said laying head in the direction of the length of said endless belt means so that said laying head lays said tire cord around a respective holding pin to form a continuous elongate cord assembly the edges of which are formed by a series of folded cord edges;

(e) means for applying elastomer to said cord assembly to produce tire breaker fabric; and (f) means for moving said holding pin to withdraw said holding pins from said tire breaker fabric.

2. An apparatus according to claim 1, wherein the edge loop holding units are moved in the direction of the centreline of the fabric and the tire cord laying head is cycled to and fro in a constant path.

3. An apparatus according to claim 2, wherein the tire cord laying head comprises a feed guide through which the tire cord is passed and means are provided to guide and drive the feed guide to and fro across the space between the edge holding units.

4. An apparatus according to claim 3, wherein the feed guide comprises a pair of co-operating guide rollers and the tyre cord is fed through the nip between the guide rollers.

5. An apparatus according to claim 3, wherein the tire cord is supplied to the feed guide by means of a constant tension tire cord feed device.

6. An apparatus according to claim 3, wherein the feed guide is mounted on a carriage running on a rail which extends across the space between the edge units.

7. An apparatus according to claim 6, wherein the carriage is free running on the rail and a drive rod extending from a side region of the apparatus is connected to the carriage and provides the driving force for the to and fro movement.

8. An apparatus according to claim 3, wherein additional guide and drive means are provided for the feed guide for movement in a direction substantially perpendicular to the direction of movement across the space between the edge holding units so that the cord may be laid around a looped path to form the edge loops.

9. An apparatus according to claim 8, wherein the additional drive means comprises can and follower devices associated one with the rail and the other with the carriage.

10. An apparatus according to claim 3, wherein the feed guide drive and guide means which comprise the laying head are mounted so that the tire cord is laid at an acute angle to the centreline of the fabric.

11. An apparatus according to claim 10, wherein the feed guide drive and guide means are mounted on a sub-frame such that the acute angle may be changed by rotation of the sub-frame in the plane of the fabric.

12. An apparatus according to claim 1, wherein each holding pin extends perpendicularly to the plane of the fabric.

13. An apparatus according to claim 12, wherein the holding pins are mounted in guide blocks which are interconnected to form at each edge of the fabric said endless belt means such that the projecting pins are taken from the coating device to the laying head to receive further edge loops in the fabric.

14. An apparatus according to claim 13, wherein at least two adjacent pins are mounted in each guide block.

15. An apparatus according to claim 2, wherein a guide rail is provided for each edge holding unit, the guide rails being parallel in the fabric engaging zone and synchronized drive means provide the movement of the edge holding units.

16. An apparatus according to claim 15, wherein the movement of the edge holding units is carried out while the laying head is traversing between the edge holding units.

17. An apparatus according to claim 13, wherein the pins are slidably mounted in the guide blocks and drive means are provided for sliding the pins in and out of said guide blocks.

18. An apparatus according to claim 1, wherein loop formers are provided to close the loops in the cords at the edges of the fabric.

19. An apparatus according to claim 18, wherein the loop formers each comprise a clip formed by a pair of complementary anvils pivotally interconnected at one end and each including a notch to accommodate a pin.

20. An apparatus according to claim 1, wherein the coating device comprises a roller for applying elastomeric material to the cord assembly.

21. An apparatus according to claim 20, wherein a pair of rollers are provided and the cord assembly is passed between said rollers.

22. A method of manufacture for tire breaker fabric comprising a single tire cord having a zig-zag lay in the fabric, wherein the method comprises;

feeding tire cord to a cord feed guide, propelling the feed guide in a first direction across the space between a pair of spaced apart edge holding units each including a plurality of longitudinally spaced retractable edge loop holding pins;

moving the feed guide and the holding pins relative to one another in a direction perpendicular to the feed guide first direction of movement so that the cord is laid around a pin at one side of the space;

propelling the feed guide back across the space in the reverse direction to the first direction;

moving the feed guide and the holding pins relative to one another in a direction perpendicular to the feed guide reverse direction of movement so that the cord is laid around a pin at the other side of the space;

repeating the above steps to produce a sheet of zig-zag assembled cord;

applying elastomeric material to a side of the assembly and withdrawing the pins from the edge loops.

23. A method according to claim 22, wherein the feed guide is moved to and fro in a constant path and the holding pins are moved through the apparatus to take the cord assembly from the laying head.

24. A method according to claim 22, wherein the holding pins are moved intermittently.

25. A method according to claim 22, wherein the cord is consolidated around each pin by crimping.

* * * * *